Patented Dec. 8, 1925.

1,564,549

UNITED STATES PATENT OFFICE.

CHARLES R. FRANKLIN, OF DOVER, NEW JERSEY.

PROCESS OF PREPARING PROPELLANT POWDERS.

No Drawing.     Application filed December 19, 1923.   Serial No. 681,629.

(GRANTED UNDER THE ACT OF MARCH 3, 1883; 22 STAT. L. 625.)

*To all whom it may concern:*

Be it known that I, CHARLES R. FRANKLIN, a citizen of the United States, and a resident of Dover, county of Morris, and State of New Jersey, have invented an Improvement in Processes for Preparing Propellant Powders, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of the present invention is a process for preparing propellant powders.

The primary object of my invention is the establishment of a method for preparing a propellant powder which will meet all ballistic requirements and which will be flashless and nonhygroscopic.

With the foregoing and other objects in view, my invention resides in the steps comprising my process and in the details of preparation hereinafter described and claimed, it being understood that changes in the precise embodiment of the invention herein disclosed may be made within the scope of what is claimed without departing from the spirit of the invention.

The powder which may be prepared according to my invention will consist, preferably, of nitrocellulose, a colloiding explosive such as nitroglycerine, a flash reducing agent and a stabilizer. Such a powder is described in the copending application of the present inventor and one John B. Fidlar, Ser. No. 684,650, filed Jan. 5, 1924.

In carrying out my invention, nitrocellulose, of suitable solubility, with 12.60% nitrogen content, more or less, is mixed with a large excess of water, approximately six times the weight of nitrocellulose so that the mixture has an appearance not unlike that of flour batter. To this mixture will be added the necessary amount of nitroglycerine or other colloiding explosive with rapid agitation and stirring. The more violent the agitation the better. The stirring operation is continued for a suitable period, in practice, about thirty minutes after the last portion of the nitroglycerine or other colloiding explosive has been added. This step in the manufacture on account of the great quantity of water used is designated as "wet mixing".

The mixture is then transferred to a centrifuge and the excess water wrung out so that the moisture content of the solid material will, preferably, be not less than 30% nor more than 45%, 30% being considered preferable. The material is then placed in a dough-mixing machine similar to that used in the manufacture of U. S. Army Service powder and the necessary amounts of a stabilizer such as diphenylamine and a flash reducing agent such as hydrocellulose added. The hydrocellulose may be either wet or dry, preferably, dry. The mass is then mixed for a suitable period, in practice, about thirty minutes. This operation has been designated in the manufacture as the first dry mixing.

The material is now passed through pressure rolls heated to a suitable temperature between 80° C. and 100° C. This process is known as the first or preliminary rolling and has a two-fold purpose in that it squeezes out the excess water and promotes the colloiding action of the nitroglycerine or similar explosive.

The rolled material is spread on trays and allowed to remain for a suitable period, in practice from twenty-four to forty-eight hours at a temperature of from 50° C. to 60° C. During this step the materials become practically free from moisture. This operation is known as seasoning.

The semi-colloided dry material is again passed through a dough-mixing machine and approximately 25% of its weight of acetone or a similar solvent added and the mass mixed for a suitable period, in practice about twenty minutes. This step in the process is designated as the second dry mixing or final mixing.

The partially colloided materials are then passed through pressure rolls heated to a temperature of approximately 50° C. to 70° C. to complete the colloiding action. This step in the manufacture is termed the second or final rolling. The material during this period forms into a uniform cohering, colloided substance, adhering tightly to the rolls. It is cut in a direction parallel to the axis of the roll and removed in the form of a tough pliable sheet. The sheets are cut into strips of the width and length desired, suitable allowance being made for shrinkage during drying.

The strips are dried for a suitable period, approximately six days at a temperature of from 50° C. to 60° C. After drying the powder is ready for use.

A powder made according to the process described may have the following composition:

| | Per cent. |
|---|---|
| Nitrocellulose | 79.5 |
| Nitroglycerine | 10.0 |
| Hydrocellulose | 10.0 |
| Diphenylamine | .5 |

It is not intended, however, to limit my invention to the preparation of a powder having the ingredients in the proportions above cited since the method described may be used in the manufacture of other propellants where nitrocellulose, a colloiding explosive and a flash reducing agent are employed. The formula, hence, is cited merely as an illustration of some of the materials that can be utilized by this process of manufacture to form a successful propellant powder.

Having thus described my invention, what I claim is:

1. The process of preparing a propellant powder which includes mixing nitrocellulose of approximately 12.60% nitrogen content with a large excess of water, then adding the necessary amount of nitroglycerine with rapid agitation, then wringing out the excess of water, then adding a stabilizer and a proper amount of a flash reducing compound and mixing, then passing the material thus formed through heated pressure rolls, then seasoning for a proper period, then mixing the whole with a proper amount of a volatile solvent then again passing through heated rolls until the mass becomes a uniformly, cohering, colloided substance, then cutting and drying.

2. The process of preparing a propellant powder which includes mixing notrocellulose with a large excess of water, then adding nitroglycerine with rapid agitation, then wringing out the excess water, then adding a stabilizer and a flash reducing compound and mixing, then subjecting the material thus formed to heat and pressure, then seasoning and mixing with a solvent, then again subjecting to heat and pressure until the mass becomes a uniformly colloided substance, then cutting and drying.

3. The process of preparing a propellant powder which includes mixing nitrocellulose with a large excess of water, then adding nitroglycerine with rapid agitation, then wringing out the excess water, then adding a stabilizer and flash reducing compound and mixing, then subjecting the material thus formed to heat, then seasoning, then mixing the whole with a solvent, then again subjecting to heat until the mass becomes a uniformly colloided substance, then cutting and drying.

4. The process of preparing propellant powder which includes mixing nitrocellulose with a large excess of water, then adding nitroglycerine with rapid agitation, then wringing out the excess water, then adding a stabilizer and a flash reducing compound and mixing, then subjecting the material thus formed to pressure, then seasoning, then mixing the whole with a solvent, then again subjecting to pressure until the mass becomes a uniformly colloided substance, then cutting and drying.

5. The process of preparing a propellant powder which includes mixing nitrocellulose with a large excess of water, adding nitroglycerine and mixing, wringing out the excess water, then mixing with a flash reducing compound, then passing through heated pressure rolls, then seasoning, then treating the material with a solvent, then again passing through pressure rolls, then cutting to the desired shapes and sizes and drying.

6. The process of preparing a propellant powder which includes mixing nitrocellulose and a colloiding explosive with a large excess of water, then adding a flash reducing compound, passing the mass through pressure rolls, cutting to the desired shapes and sizes and drying.

7. The process of preparing propellant powder which includes mixing nitrocellulose and a colloiding explosive with a large excess of water, then adding a flash reducer and a stabilizer, passing the mass through pressure rolls, and cutting to the desired shapes and sizes and drying.

8. The process of preparing propellant powder which includes mixing nitrocellulose and a colloiding explosive with a large excess of water, adding a stabilizer, then passing through pressure rolls, then cutting to the desired shapes and sizes and drying.

9. The process of preparing a propellant powder which includes mixing nitrocellulose and a colloiding explosive with a large excess of water, then adding a flash reducing compound, then subjecting the mass to pressure, then cutting and drying.

10. The process of preparing propellant powder which includes mixing nitrocellulose and a colloiding explosive with a large excess of water, then adding a flash reducing compound, then subjecting the mass to heat, then cutting and drying.

CHARLES R. FRANKLIN.